United States Patent [19]
Wagner

[11] Patent Number: 5,641,253
[45] Date of Patent: Jun. 24, 1997

[54] TUBE CHAMFERING DEVICE

[75] Inventor: Rudolf Wagner, Stuttgart, Germany

[73] Assignee: REMS-WERK Christian Föll und Söhne GmbH & Co., Waiblingen, Germany

[21] Appl. No.: 409,826

[22] Filed: Mar. 23, 1995

[30] Foreign Application Priority Data

Mar. 23, 1994 [DE] Germany ............... 44 09 983.5

[51] Int. Cl.$^6$ ............................................. B23C 1/20
[52] U.S. Cl. ..................................... 409/179; 82/113
[58] Field of Search ............................ 409/179, 178, 409/175; 82/113; 30/94, 95, 93

[56] References Cited

U.S. PATENT DOCUMENTS 3,636,803  1/1972  Miller .......................... 82/113
4,180,358  12/1979  Uribe ........................... 409/179

FOREIGN PATENT DOCUMENTS 12027     6/1976  Australia ....................... 82/113
2353279   5/1974  Germany ....................... 82/113

*Primary Examiner*—William R. Briggs
*Attorney, Agent, or Firm*—Robert W. Becker & Associates

[57] ABSTRACT

A tube chamfering device has a support structure with two supporting legs positioned at a first angle to one another for supporting a tube to be chamfered. A holding member is connected to the support structure. At least one chamfering tool, connected to the holding member, for chamfering an exterior surface of the tube is provided. At least the two supporting legs of the support structure consist of a wear-resistant plastic material.

17 Claims, 3 Drawing Sheets

TUBE CHAMFERING DEVICE

BACKGROUND OF THE INVENTION

The present invention relates to a tube chamfering device that is provided with a support structure which is arranged at a holding member and is provided with two supporting legs positioned at a first angle to each other for supporting the tube that is to be chamfered at its exterior surface by at least one chamfering tool.

Such tube chamfering devices have the purpose of chamfering a tube at its exterior surface. The tube to be machined is placed onto the supporting sides of the support structure which are composed of a metallic material and then it is chamfered at its exterior surface by the chamfering tool. During the chamfering process such high frictional forces occur between the tube and the supporting surface of the supporting side that the supporting sides wear out rapidly. For this reason felt and other protecting means are mounted on the supporting sides. However, they represent additional members that have to be mounted on the supporting sides in a separate mounting step and thereby increase the costs for the chamfering device. Due to the high frictional forces that occur during the chamfering process, there is also the risk that the protecting means become detached from the supporting sides.

It is therefore an object of the invention to improve the aforementioned tube chamfering device such that the supporting sides are subject to only low wear during the chamfering process and can be manufactured easily and cost-efficiently.

SUMMARY OF THE INVENTION

A tube chamfering device according to the present invention primarily is characterized by:

a support structure, comprising two supporting legs positioned at a first angle to one another, for supporting a tube to be chamfered;

a holding member connected to the support structure;

at least one chamfering tool, connected to the holding member, for chamfering an exterior surface of the tube;

wherein at least the two supporting legs of the support structure are comprised of a wear-resistant plastic material.

The two supporting legs are preferably formed as a one-part piece.

The support structure is expediently a unitary part and the entire support structure is comprised of the plastic material.

The plastic material is advantageously a thermosetting plastic.

The plastic material may be a mixture of different wear-resistant plastics.

The plastic material is may be a fiberglass-reinforced polyamide.

The plastic material advantageously may be polypropylene or polyformaldehyde.

The holding member is preferably comprised of a metallic material.

The support structure expediently is displaceable relative to the holding member.

The tube chamfering device further comprises a bearing connected to the holding member. The bearing is preferably displaceable relative to the holding member. The bearing preferably comprises a freely rotatable sleeve.

Each one of the two supporting legs has an end portion and the end portions face one another. The end portions are positioned at a second angle to one another. The second angle is smaller than the first angle.

The tube chamfering device further comprises a supporting bar connected to the holding member and positioned adjacent to the chamfering tool.

Preferably, the tube chamfering device comprises two of the chamfering tools, wherein one of the chamfering tools acts as a supporting bar for the tube during chamfering. The two chamfering tools are preferably identical to one another. The chamfering tools each have a cutting edge, and the cutting edges point in the same direction.

Preferably, the two chamfering tools are detachably connected to the holding member.

With the inventive tube chamfering device the supporting sides are composed of a wear-resistant plastic material. Surprisingly, it could be demonstrated that by such an embodiment the wear of the supporting sides is so low that it is not to be expected that the supporting sides wear out during the service life of the tube chamfering device. The supporting sides can be manufactured out of wear-resistant plastic material very easily and cost-efficiently. In particular, no additional protecting means are required which have to be mounted on the supporting sides in separate mounting steps. Therefore, the problem of such protecting means becoming detached during the chamfering process does not occur with the inventive tube chamfering device. The inventive tube chamfering device can thus be employed without problems.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 3:
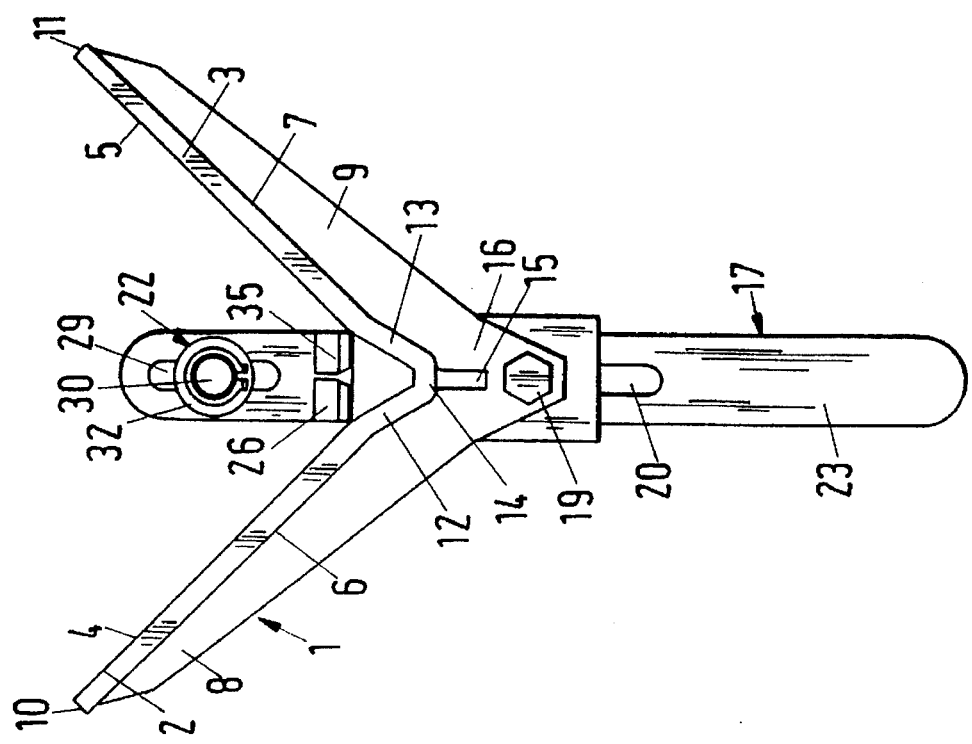
FIG. 3 illustrates a front view of the tube chamfering device according to FIG. 1.

The purpose of the tube chamfering device is to chamfer the exterior surfaces of tube ends. The tube chamfering device has a support structure 1 provided with two supporting legs 2 and 3 that are positioned at a first angle to each other, preferably perpendicularly. During the chamfering process the tube 27 to be chamfered rests on these supporting legs 2, 3. The supporting legs 2, 3 are shaped rectangularly (FIGS. 1 and 2) and have a transition into each other. Their inner sides 4 and 5, facing each other, are plane so that the tube to be chamfered rests safely on the sides 4, 5 during the chamfering process. The outer sides 6 and 7 of the supporting legs 2, 3 are turned away from each other and are provided respectively with at least one reinforcement element 8 and 9 which respectively extends in the vertical direction of the supporting legs 2, 3 and perpendicularly to the outer sides 6, 7. The height of the reinforcement elements 8, 9 decreases toward the free edge 10, 11 of the supporting legs 2, 3 (FIG. 3). By this means the reinforcement elements 8, 9 have their greatest height in the area of the transition between the legs 2, 3 so that the supporting legs 2, 3 are supported optimally. Therefore, there is no risk that they become deformed during the chamfering process by the forces that act on them. The reinforcement elements 8, 9 advantageously also have a transition into each other.

Figure 2:
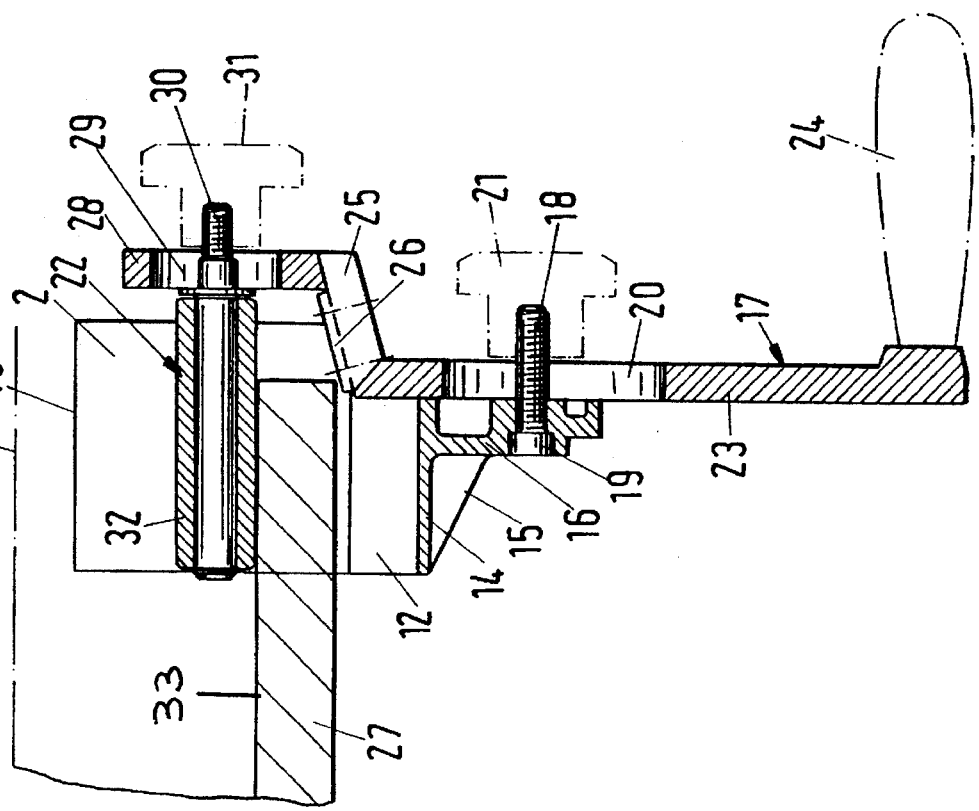
FIG. 2 illustrates a cross-section of the tube chamfering device according to FIG. 1.

Each supporting leg 2, 3 provides an obtuse-angled end portion 12, 13 (FIG. 3). While the inner sides 4, 5 of the supporting legs 2, 3 are positioned perpendicularly to each other for the largest portion of their height, the obtuse-angled end portions 12, 13 of the supporting legs 2, 3, having a transition into each other, are positioned with a smaller second angle to each other. The transition area between the two end portions 12, 13 of the supporting sides 2, 3 is straight. As FIGS. 2 and 3 illustrate, this transition area 14 is supported by a rib 15 which is positioned perpendicularly to the transition area 14 and has a triangular shape in the illustration according to FIG. 2. The rib 15 extends from the free edge of the transition area 14 to a supporting member 16 into which the reinforcement elements 8, 9 of the supporting legs 2, 3 have a transition. The supporting member 16 of the support structure 1 abuts a holding member 17.

The supporting member 16 is penetrated by a screw 18, the head 19 of which is countersunk in the supporting member 16. The screw 18 penetrates a longitudinal slot 20 of the holding member 17. On the screw 18 a lock nut 21 is provided that is equipped with a turn knob 21 and by which the support structure 1 can be tightened to the holding member 17. The head 19 of the screw 18 is advantageously designed to be angular-shaped so that it is secured against rotating during the tightening process in a simple way. In the longitudinal slot 20 of the holding member 17 the screw 18 is continuously adjustable to the required position relative to a bearing 22 in order to achieve an adjustment to different tube diameters.

The holding member 17 has a stay-shaped holding portion 23 that is provided with the longitudinal slot 20 extending in its longitudinal direction. At its free end the holding portion 23 is provided with a perpendicularly projecting grip 24 that preferably is detachably mounted on it. The grip 24 is advantageously rotatable about its axis. Via this grip 24 the entire tube chamfering device is rotated during the chamfering process in a manner still to be described. The lock nut 21 and the grip 24 are located at the side of the holding portion 23 that faces away from the supporting member 16 of the support structure 1.

Approximately at the level of the obtuse-angled end portions 12, 13 of the supporting legs 2, 3, the holding portion 23 comprises an obtuse-angled transition into a mounting member 25 that is also designed to be stay-shaped and on which a chamfering tool 26 and a supporting bar 35 are mounted. The tool 26 and the bar 35 are mounted detachably so that they can simply be replaced when they are worn. As is illustrated in FIG. 2, the chamfering tool 26 and the supporting bar 35 are positioned at the respective chamfering angle to the axis of the tube 27 to be machined.

The mounting member 25 has an obtuse-angled transition into a further holding portion 28 that is positioned parallel to the holding portion 23 and at which the bearing 22 is mounted detachably. The further holding portion 28 is also designed to be stay-shaped. It has a longitudinal slot 29 that extends in its longitudinal direction and is penetrated by a threaded bolt 30 on which a lock nut 31, provided with a turn knob, is positioned. By the lock nut 31 the bearing 22 can be tightened to the further holding portion 28 at the position desired.

Figure 1:
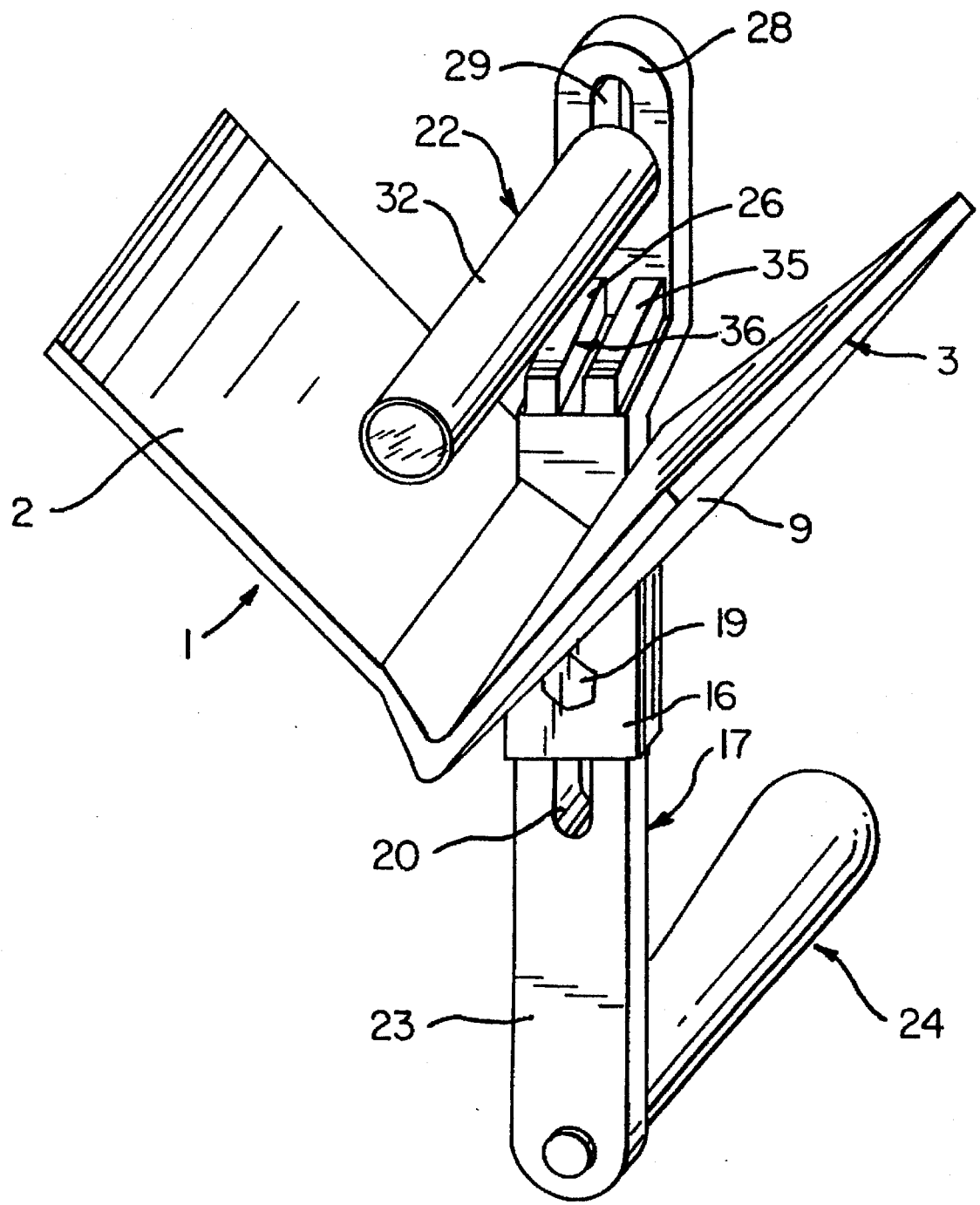
FIG. 1 illustrates a perspective view of an inventive tube chamfering device.

On the threaded bolt 30 a sleeve 32 is positioned that is preferably freely rotatable and which forms a part of the bearing. The sleeve 32 is located on the threaded bolt 30, is axially secured, and extends advantageously along the entire width of the supporting legs 2, 3 (FIG. 2). As is illustrated in FIGS. 1 and 3, the bearing 22 is positioned centrally between the two supporting sides 2, 3.

The tube 27 to be chamfered is placed onto the two supporting legs 2, 3 such that the bearing 22 extends into the tube 27. Subsequently, after appropriately loosening the lock nuts 22, respectively, 31, the support structure 1 and/or the bearing 22 are adjusted such that the bearing 22, respectively, its sleeve 32 rests on the interior surface 33 of the tube 27 (FIG. 2). The axis 34 of the tube 27 is not aligned with the axis of the bearing 22. By tightening the lock nuts 21, respectively, 31, the support structure 1 and/or the bearing 22 are attached to the holding member 17 in this position. The chamfering tools 26 rest on the exterior surface of the free end of the tube 27. The tube 27 is clamped in an appropriate clamping tool so as not to rotate. The chamfering tool is activated by the grip 24 so as to be rotated around the tube 27. As a result of this a slight push in the axial direction of the tube 27 is applied to the tube chamfering device such that it moves in the direction of the tube. On rotating, the chamfering tools 26 chamfer the exterior surface of the tube end. Since the grip 24 is advantageously rotatable around its own axis, the tube chamfering device can be easily rotated around the tube 27. Since the sleeve 32 rests on the interior surface 33 of the tube 27, the sleeve 32 rotates around its own axis whereby the rotation of the tube chamfering device is considerably facilitated.

When a tube is to be chamfered, the interior diameter of which is smaller than the exterior diameter of the sleeve 32, then the tube is placed on the obtuse-angled portions 12, 13 and the bearing 22 is adjusted such that the sleeve 32 rests on to of the tube. The thin tube can be chamfered in the described manner with the chamfering tool 26. The bearing 22 perfectly supports the tube during the chamfering process.

At least the two supporting legs 2, 3 of the support structure are manufactured completely out of a wear-resistant plastic material. Preferably, the entire support structure 1 is comprised of such a wear-resistant plastic material. Thus, the support structure 1 can be manufactured easily and, above all, cost-efficiently. Possible wear-resistant plastic materials are polyamide, polypropylene and the like, but also polyformaldehyde, as well as other thermosetting plastics. These plastics have such a high wear-resistance that the great frictional forces occurring during the chamfering process between the tube 27 and the inner side 4, 5 of the supporting sides 2, 3 do not lead to a wear of the supporting sides 2, 3. Thus the support structure 1 has a very long service life. Since at least the supporting has 2, 3, however, preferably the entire support structure 1, is comprised of such a wear-resistant plastic, no additional protecting means or the like are required for protecting the inner sides 4, 5 in order to prevent a premature wear of the support structure. Thus, also the processing steps required for mounting such additional protecting means, which lead to a substantial rise in price of the support structure and thus of the entire tube chamfering device, are obsolete.

The supporting legs 2, 3, preferably the entire support structure 1, can also be comprised of a mixture of wear-resistant plastics. Thus, an optimal adjustment to the respective application of the chamfering device is ensured.

In the embodiment according to FIGS. 1 to 3 the tube chamfering device has only one chamfering tool 26, the cutting edge 36 of which (FIG. 1) faces the supporting bar

Figure 4:
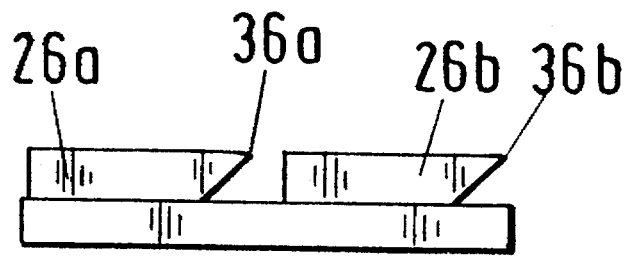
FIG. 4 illustrates the chamfering tools of another embodiment of an inventive chamfering device in an enlarged front view.

35. FIG. 4 illustrates that the tube chamfering device can also be provided with two identical chamfering tools 26a, 26b. One chamfering tool 26a, respectively, 26b chamfers the tube with its cutting edge 36a, respectively, 36b, while the other chamfering tool 26b, respectively, 26a acts as a support means (supporting bar). If one of the chamfering tools wears out, it can be replaced with the other chamfering tool. The worn chamfering tool can still be employed as a support means. The two chamfering tools 26a, 26b are arranged such that their cutting edges point in the same direction. Thus, it is ensured that the chamfering tool acting as a support means does not engage the tube with its cutting edge during the chamfering process.

The present invention is, of course, in no way restricted to the specific disclosure of the specification, examples, and drawings, but also encompasses any modifications within the scope of the appended claims.

What I claim is:

1. A tube chamfering device comprising:

a support structure, comprising two supporting legs positioned at a first angle to one another, for supporting a tube to be chamfered;

a holding member connected to said support structure;

at least one chamfering tool, connected to said holding member, for chamfering an exterior surface of the tube;

wherein at least said two supporting legs of said support structure are comprised of a wear-resistant plastic material;

a bearing connected to said holding member, said bearing having means for displacing said bearing relative to said holding member.

2. A tube chamfering device according to claim 1, wherein said two supporting legs are formed as a one-part piece.

3. A tube chamfering device according to claim 2, wherein said support structure is a unitary part and wherein said entire support structure is comprised of said plastic material.

4. A tube chamfering device according to claim 1, wherein said plastic material is a thermosetting plastic.

5. A tube chamfering device according to claim 1, wherein said plastic material is a mixture of different wear-resistant plastics.

6. A tube chamfering device according to claim 1, wherein said plastic material is fiberglass-reinforced polyamide.

7. A tube chamfering device according to claim 1, wherein said plastic material is polypropylene.

8. A tube chamfering device according to claim 1, wherein said plastic material is polyformaldehyde.

9. A tube chamfering device according to claim 1, wherein said holding member is comprised of a metallic material.

10. A tube chamfering device according to claim 1, wherein said support structure is displaceable relative to said holding member.

11. A tube chamfering device according to claim 1, wherein said bearing comprises a freely rotatable sleeve.

12. A tube chamfering device comprising:

a support structure, comprising two supporting legs positioned at a first angle to one another, for supporting a tube to be chamfered;

a holding member connected to said support structure;

at least one chamfering tool, connected to said holding member, for chamfering an exterior surface of the tube;

wherein at least said two supporting legs of said support structure are comprised of a wear-resistant plastic material;

each one of said two supporting legs having an end portion;

said end portions facing one another;

said end portions positioned at a second angle to one another;

said second angle smaller than said first angle.

13. A tube chamfering device according to claim 1, further comprising a supporting bar connected to said holding member and positioned adjacent to said chamfering tool.

14. A tube chamfering device comprising:

a support structure, comprising two supporting legs positioned at a first angle to one another, for supporting a tube to be chamfered;

a holding member connected to said support structure;

two chamfering tools, connected to said holding member, for chamfering an exterior surface of the tube;

wherein at least said two supporting legs of said support structure are comprised of a wear-resistant plastic material;

wherein one of said chamfering tools acts as a supporting bar for the tube during chamfering.

15. A tube chamfering device according to claim 14, wherein said two chamfering tools are identical to one another.

16. A tube chamfering device according to claim 14, wherein said chamfering tools have a cutting edge and wherein said cutting edges point in the same direction.

17. A tube chamfering device according to claim 14, wherein said two chamfering tools are detachably connected to said holding member.

* * * * *